United States Patent Office 3,151,101
Patented Sept. 29, 1964

3,151,101
BLENDS OF AN ALDEHYDE-MODIFIED UNSATURATED CARBOXYLIC ACID AMIDE INTERPOLYMER AND AN ESTER OF TITANIUM
Henry A. Vogel and Harold G. Bittle, Gibsonia, Pa., assignors to Pittsburgh Plate Glass Company, Pittsburgh, Pa., a corporation of Pennsylvania
No Drawing. Filed Oct. 17, 1960, Ser. No. 62,867
10 Claims. (Cl. 260—80.5)

This invention relates to new and useful resinous compositions and more particularly it relates to blends of (1) an aldehyde-modified unsaturated carboxylic acid amide interpolymer, and (2) an ester of titanium.

In copending application, Serial No. 749,583, filed July 21, 1958, now U.S. Patent No. 3,037,963, there is disclosed a process for producing useful resinous products from unsaturated carboxylic acid amides such as acrylamide or methacrylamide. The process disclosed in said copending application involves forming an interpolymer of such unsaturated carboxylic acid amides with at least one other polymerizable ethylenically unsaturated monomer, and then reacting said interpolymer with an aldehyde such as formaldehyde, preferably in the presence of an alcohol such as butanol. The resulting resins range from soft, flexible materials to very hard solids, depending upon the choice of monomers utilized in preparing the amide interpolymer which in turn is reacted with the aldehyde and optionally with the alcohol.

The resins prepared in accordance with the method described in said copending application, Serial No. 749,583 are useful in coating compositions, laminates, and the like, and properties may be modified when blended with one or more other resinous materials such as epoxide resins, vinyl resins, amine resins, alkyd resins, nitrocellulose, polyethylene, and the like. Such resinous blends form films with excellent flexibility, recoat adhesion, and freedom from undesirable color formation, even on overbaking of the film. These films are also outstanding in appearance, gloss, adhesion, mar resistance, color retention, moisture resistance, stain resistance, grease resistance, heat resistance, detergent resistance, and corrosion resistance. Moreover, these outstanding properties are obtained in a single coating of the resinous coating composition on a metallic surface, whereas previous coating compositions have almost without exception required the use of one or more so-called "primer" coats.

The outstanding properties set forth in the foregoing paragraph render the aldehyde-modified carboxylic acid amide interpolymer coating compositions useful as finishes for appliances, such as ranges, refrigerators, air conditioners, washers, water heaters, as well as finishes for steel building panels and aluminum siding, and in fact as general industrial finishes on solid surfaces, such as metals, plastics, wallboard, and the like. Such compositions have met with wide commercial acceptance throughout the world.

The aldehyde-modified carboxylic acid amide interpolymer resins and blends thereof with other resinous materials however possess one disadvantage in that coating compositions prepared therefrom should be cured at temperatures of about 350° F. for a period of 30 minutes in order that the outstanding properties set forth hereinabove for such materials will be obtained to the optimum degree. Many industrial finishing installations do not possess oven facilities which can attain temperatures as high as 350° F., and consequently industries lacking such installations cannot obtain optimum properties from coating compositions containing the aldehyde-modified carboxylic acid amide interpolymer resins.

It has now been discovered that the curing temperatures of the carboxylic acid amide interpolymer-aldehyde condensation products can be advantageously blended with titanium esters to form coating compositions having lower curing temperatures. Moreover, these coating compositions are more solvent resistant and harder at reduced temperature cures as compared with the unmodified carboxylic acid amide interpolymer condensation products. By varying the amount of titanium ester the curing temperature can be adjusted to almost any tempereature below 350° F. to room temperature. Air-dry formulations, that is, formulations which may be used at room temperature greatly increase the scope of utility of the aforementioned aldehyde-modified carboxylic acid amide interpolymer compositions. Moreover, the titanate esters themselves impart refractory qualities to the fully cured coatings and are therefore adaptable as coatings for devices which are kept at elevated temperatures for sustained lengthy periods of time, for instance space heaters, radiators, etc.

In the preparation of the aldehyde-modified amide interpolymer resin a polymerizable unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relatively short chain soluble interpolymer having an approximate structure as follows, acrylamide being utilized for illustrative purposes:

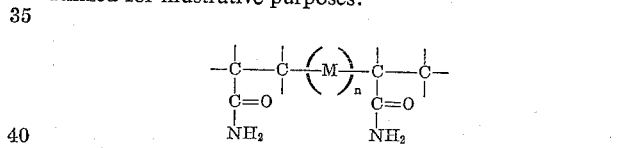

wherein M represents a unit of a monomer polymerizable with acrylamide, and $n$ represents a whole number greater than 1. For example, if styrene were utilized as the second monomer, M would represent the unit

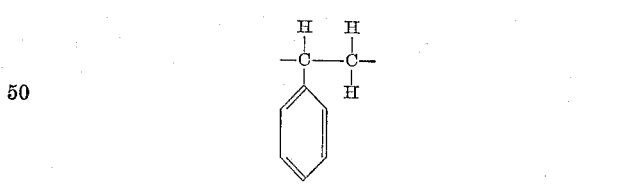

The short chain interpolymer then reacts with an aldehyde, as represented by formaldehyde, to give the structure

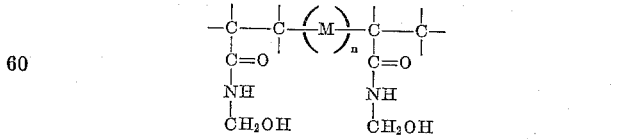

wherein M and $n$ have the significance set forth hereinabove.

In the event the aldehyde is utilized in the form of a solution in butanol or other alkanol, etherification will take place so that at least some of the methylol groups in the above structure will be converted to groups of the structure

wherein R is selected from the class consisting of hydrogen and a saturated lower aliphatic hydrocarbon radical having its free valences on a single carbon atom, and $R_1$ is a member of the class consisting of hydrogen and the radical derived by removing the hydroxyl group from the alkanol.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol, such as methanol, ethanol, propanol, pentanol, octanol, decanol, and other alkanols containing up to about 20 carbon atoms may also be employed as may aromatic alcohols, such as benzyl alcohol or cyclic alcohol.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamyl maleimide may also be utilized.

Any polymerizable monomeric compound containing at least one $CH_2=C<$ group may be polymerized with the unsaturated carboxylic acid amide. Examples of such monomers include the following:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-propene-1, 2-methyl-butene-1, 2-methyl-pentene-1, 2,3-dimethyl-butene-1, 2,3-dimethyl-pentene-1, 2,4-dimethyl-pentene-1, 2,3,3-trimethyl-butene-1, 2-methyl-heptene-1, 2,3-dimethyl-hexene-1, 2,4-dimethyl-hexene-1, 2,5-dimethyl-hexene-1, 2-methyl-3-ethyl-pentene-1, 2,3,3-dimethyl-pentene-1, 2,3,4-trimethyl-pentene-1, 2,4,4-trimethyl-pentene-1, 2-methyl-octene-1, 2,6-dimethyl-heptene-1, 2,6-dimethyl-octene-1, 2,3-dimethyl-decene-1,2-methylnonadecene-1, ethylene, propylene, butylene, amylene, hexylene, butadiene-1,3, isoprene, and the like;

(2) Halogenated monoolefinic and diolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and parafluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2-chloropropene, 2-chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1,1,2,2-tetrachloroethylene, 1-chloro-2,2,2-trifluoroethylene, chlorobutadiene and other halogenated diolefinic compounds;

(3) Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzonate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate, and ethyl tiglate;

Methyl acrylate, ethyl acrylate, propyl acrylate, isopropyl acrylate, butyl acrylate, isobutyl acrylate, amyl acrlate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl lacohol, beta-propyl allyl alcohol, 1-buten-4-ol, 2-methyl-buten-4-ol, 2(2,2-dimethylpropyl)-1-buten-4-ol, and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate and diethyl glutaconate;

(4) Organic nitriles, such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like.

It is to be understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide component with those monomers which ordinarily form hard polymers, given hard and flexible films, whereas interpolymers containing lower levels of the amide component with those monomers which ordinarily form soft homopolymers tend to be considerably softer. If more than one ethylenically unsaturated monomer is polymerized with the amide, the proportions of such additional monomers utilized will depend upon the characteristics which the monomer or monomers will impart to the final interpolymer.

The preparation of the amide interpolymer is described in detail in U.S. Patents 2,870,116 and 2,870,117, the disclosure of which is incorporated herein by reference.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of amide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization of the very rapid reaction rate and because the reaction is highly exothermic. Some control of the heat of reaction is obtained by adding the acrylamide to the polymerization mixture incrementally. Good agitation is also desirable.

The carboxylic acid amide interpolymer resin prepared according to the disclosures in the above-identified patents is reacted with an aldehyde, preferably in the presence of an alcohol. Formaldehyde, in solution in water (formalin) or in an alkanol such as butanol, or a formaldehyde-yielding substance such as paraformaldehyde, trioxymethylene, or hexamethylenetetramine is greatly preferred. However, other aldehydes including acetaldehyde, butyraldehyde, furfural, and the like, preferably containing only atoms of carbon, hydrogen and oxygen can be used. Dialdehydes such as glyoxal are preferably not employed, since they tend to cause the amide interpolymer resin to gel.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst, such as maleic anhydride. Other acid catalysts, such as oxalic acid, hydrochloric acid, or sulfuric acid, may also be employed, although there is some possibility of gelatin occurring if the acid catalyst is too strongly acidic. The quantity of catalyst utilized may be varied widely; for example, as pointed out hereinabove, the more acidic the reaction medium, the greater amount of etherification will occur.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers and refluxing the resulting mixture for a period of from about 3 to about 5 hours until the desired viscosity is obtained. The water of condensation can be removed by azeotropic distillation, as may a portion of the solvent if desired. In fact, when the aldehyde is utilized in the form of a solution in an alkanol such as butanol, it is desirable that approximately half of the butanol be distilled off at the end of the reaction period and replaced by another solvent, such as xylol; alternatively, the reaction may be conducted in a solvent mixture. It is preferred that the final resinous material have a solids content of about 20 percent to 70 percent.

Similar polymeric materials may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the $CH_2=C<$ monomers set forth hereinabove. This method, described in copending application, Serial No. 775,380, filed November 21, 1958, does not require reaction of the polymer with an aldehyde since the N-alkoxyalkyl amide monomers already contain

groups, wherein R and $R_1$ have the meaning set forth above.

Regardless of the method by which the resinous material is obtained, it will contain in the polymer chain recurrent groups of the structure

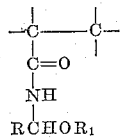

wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some, and preferably more than about 50 percent of the radicals $R_1$ will represent the radical derived from the alcohol. When the aldehyde is utilized alone, that is, not in an alcohol solution, the radical $R_1$, of course, will represent hydrogen. The free valences in the above structure may be satisfied with either hydrogen or hydrocarbon depending upon the amide which is utilized in the interpolymerization reaction.

The exact mechanism by which the curing temperature is lowered is not definitely known but one possible explanation is that the titanium esters have a great affinity for groups which easily enter into ester-interchange reactions, act as cross-linking agents and thereby aid in the actual curing and become an integral part of the polymer latice.

Typical of the titanium esters which may be employed in the instant invention are the alkyl titanates, especially the orthotitanic esters of monofunctional alcohols; the lower tetraalkyl substituted esters are preferred. Examples of these include the tetramethyl, -ethyl, -propyl, -butyl, and the tetraisopropyl titanates. However, those having much larger alkyl groups than four carbon atoms such as tetra-2-ethylhexyl and tetrastearyl titanates may also be utilized. Tetraphenyl and other tetraaryl esters may also be employed. The butyl ester is preferred because of performance and economic advantages.

These titanium esters may be prepared by several methods. One of the more common is to react titanium tetrachloride with an alkanol or mixed alkanol in the presence of ammonia or other hydrogen chloride acceptor. Reaction takes place in an anhydrous alcohol as follows:

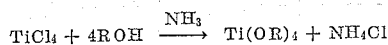

The alkyl titanates are useful in all proportions with the aldehyde-modified carboxylic acid amide interpolymers of the instant invention, and they may be advantageously employed in any amount. It has been found, however, that there is little advantage in adding amounts above 15 percent by weight of the total composition since the curing temperature is lowered to room temperature and in many instances the resinous blend has gelled in a matter of a few minutes. Amounts lower than about 3 percent fail to lower the curing temperature to room temperature but there is still a significant lowering with amounts as little as 0.2 percent by weight.

Since the esters are widely soluble in both polar and non-polar solvents the resinous aldehyde-modified carboxylic acid amide interpolymers may be used directly with their reaction medium or made up with other solvents which may have specific properties which are particularly adaptable to certain applications.

Ethanol, propanol, butanol, hexane, benzene, toluene, xylene and carbon tetrachloride are some of the more common solvents which may be employed.

In choosing the particular titanate and solvent it is sometimes advantageous to have the same alkoxy radical for the ester as that which is present on the etherified methylolated amido group of the carboxylic acid amide interpolymer. If the solvent utilized is an alcohol, it is desirable that it have the same chain length as the alkoxy radicals in case of any ester interchange. The butyl and isopropyl radical substituted esters and alcohols are the most useful because of economics and reactivity.

The following examples are given by way of illustration and not by way of limitation. All parts and percentages are given by weight unless otherwise specified.

EXAMPLE I

In accordance with this example, an interpolymerizable mixture was prepared comprising:

|  | Parts by weight |
|---|---|
| Acrylamide | 15 |
| Styrene | 40 |
| Ethyl acrylate | 45 |
| Butanol | 100 |

The above solution was refluxed for 2 hours in the presence of 1 part cumene hydroperoxide and 0.5 part tertiary dodecyl mercaptan. Five-tenths (0.5) part cumene hydroperoxide was then added and the mixture was refluxed for three successive 2-hour intervals, after each of which was added 0.5 part cumene hydroperoxide. After the fourth reflux interval, 10.5 parts butyl Formcel and 0.13 part maleic anhydride were added to the mixture, which was azeotropically distilled for 3 hours to remove the formed water of the reaction. Fifty (50) parts of the solvent mixture was then removed and replaced by 50 parts of toluene. Results:

| Viscosity (Gardner-Holdt) | U–W. |
|---|---|
| Color (Gardner) | 5 maximum. |
| Total solids (percent) | 48.52. |

EXAMPLE II

Ninety-three (93) parts of the product of Example I were mixed with 7 parts of tetrabutyl titanate. This mixture was then applied to a glass panel and baked for 20 minutes at 180° F. The coated sample had a clear, hard, mar resistant surface.

EXAMPLE III

Eighty-eight (88) parts of the product of Example I were mixed with 12 parts of tetrabutyl titanate. This mixture was then applied to a glass panel and baked for 20 minutes at 180° F. The coated sample had a clear, hard, mar resistant surface.

EXAMPLE IV

In accordance with this example, an interpolymerizable mixture was prepared comprising:

|  | Parts by weight |
|---|---|
| Arcylamide | 10 |
| Ethyl acrylate | 65 |
| Styrene | 25 |
| n-Butanol | 100 |

The above solution was refluxed for 2 hours in the presence of 1 part cumene hydroperoxide and 0.5 part tertiary dodecyl mercaptan. Five-tenths (0.5) part more cumene hydroperoxide was then added and the mixture was refluxed for more than three successive 2-hour intervals, after each of which was added 0.5 part cumene hydroperoxide. After the fourth 2-hour reflux interval, 21 parts butyl Formcel and 0.3 part maleic anhydride were added to the mixture, which was azeotropically distilled for 3 hours to remove the formed water of reaction.

Fifty (50) parts of the n-butanol were removed and replaced with 50 parts toluene. Results:

Total solids (percent) _____ 48
Viscosity (Gardner-Holdt) _____ T–X
Weight per gallon (pounds) _____ 8.1
Color (Gardner) _____ 7

EXAMPLE V

An acrylamide interpolymer was prepared from the following components in the amounts set forth:

| | Parts by weight |
|---|---|
| Acrylamide | 90 |
| Styrene | 231 |
| Ethyl acrylate | 264 |
| Methacrylic acid | 15 |
| n-Butanol | 300 |
| Toluene | 300 |

The above components were admixed and refluxed in the presence of 9 parts cumene hydroperoxide and 9 parts tertiary dodecyl mercaptan for 2 hours at 210° C. to 215° C., after which were added 3 parts cumene hydroperoxide. The mixture was then refluxed for three successive 2-hour periods, after each of which was added 3 parts cumene hydroperoxide. After the second reflux period, 190.5 parts butyl Formcel and 2.6 parts maleic anhydride were also added. During the last two reflux periods, the formed water of the reaction was removed by azeotropic distillation. The resulting resinous product has a solids content of 50 percent and viscosity of U–W (Gardner-Holdt).

EXAMPLE VI

A pigment paste was made up as follows:

| | Parts by weight |
|---|---|
| Product of Example IV | 480 |
| Xylene | 420 |
| Carbon black pigment | 28 |
| Titanium dioxide (rutile) pigment | 1404 |

The above ingredients were mixed in a pebble mill for 16 hours and 222 more parts of the product of Example IV were added to the resulting paste.

EXAMPLE VII

A pigment paste was made up as follows:

| | Parts by weight |
|---|---|
| Product of Example V | 480 |
| Xylene | 420 |
| Carbon black pigment | 28 |
| Titanium dioxide (rutile) pigment | 1404 |

The above ingredients were mixed in a pebble mill for 16 hours and 222 more parts of the product of Example V were added to the resulting paste.

EXAMPLE VIII

The following example is a paint formulation which is free from the titanium esters.

| | Parts by weight |
|---|---|
| Printing past composition of Example VI | 127.7 |
| Resinous product of Example IV | 367 |

The above formulation was intimately mixed and applied to four phosphatized steel (Bonderite 1000) panels. Individual coated panels were then baked for 30 minutes at 225° F., 265° F., 300° F., and a fourth coated panel was air dried. Only the panel which was baked at 300° F. was fully cured. Both the air dried and the 225° F. treated sample was tacky and the sample which was baked at 265° F. was not fully cured and was quite soft.

EXAMPLE IX

Twenty-seven (27) parts of tetrabutyl titanate was added to the formula of Example VIII. This mixture was as before, drawn down on phophatized steel and baked for 30 minutes at 225° F., 265° F., and 300° F., and a fourth panel was air dried. All four samples were cured with a clear, mar resistant, hard surface.

EXAMPLE X

Eighteen and nine-tenths (18.9) parts of tetraisopropyl titanate was added to the composition of Example VIII. This mixture, as before, was drawn down on phosphatized steel (Bonderite 1000) and cured for 30 minutes at 225° F., 265° F., 300° F., and a fourth sample was air dried. All four samples were cured with a clear, hard, mar resistant surface.

EXAMPLE XI

A control composition was made up as follows:

| | Parts by weight |
|---|---|
| Product of Example V | 280.8 |
| Pigment paste of Example VII | 25.5 |

The above mixture was applied to phosphatized steel panels (Bonderite 1000). Individual panels were cured at 225° F., 265° F. and 300° F., and a fourth sample was air dried. Only the sample which was baked at 300° F. was fully cured and mar resistant. Both the air dried and the sample which was cured at 225° F. were still tacky and the sample which was cured at 265° F. was very soft and had no mar resistance.

EXAMPLE XII

Fifty-five and five-tenths (55.5) parts of the 10 percent solution of tetrabutyl titanate in butanol were mixed with the composition of Example XI. Phosphatized steel panels (Bonderite 1000) were coated with the above mixture and baked at 225° F., 265° F., and 300° F. for 30 minutes and a fourth sample was air dried. All four coatings were clear, hard, cured, mar resistant films.

EXAMPLE XIII

Fifty-five and five-tenths (55.5) parts of the 10 percent solution of tetraisopropyl titanate in isopropanol were added to the resinous mixture of Example XI. Phosphatized steel panels (Bonderite 1000) were coated with the above mixture and baked at 225° F., 265° F., and 300° F., for 30 minutes and a fourth sample was air dried. All four coatings were clear, hard, cured, mar resistant films.

EXAMPLES XIV TO XVIII

These examples illustrate the preparation of aldehyde-modified acrylamide interpolymers which can be blended with the titanium esters of the instant invention. The polymerization in each example was carried out by mixing the polymerizable components with a chain transfer agent (except in Example XVIII where none was utilized) in a solvent such as butanol or xylene, and adding a polymerization catalyst, either initially or in increments throughout the polymerization reaction. The polymerization mixture was then refluxed (in a bomb when butadiene-1,3 was the monomer) for a period of time sufficient to obtain a conversion of substantially 100 percent. The polymerization charge, reflux time, interpolymer properties, formaldehyde condensation procedure, and the properties of the resinous condensation product are reported in the following table, wherein the letters have the following significance:

A—Benzoyl peroxide
B—Di-t-butyl peroxide
C—Cumene hydroperoxide
D—Alpha-methyl styrene dimers
E—Dodecyl mercaptan
F—Tertiary dodecyl mercaptan

| | Example XIV<br>15% Acrylamide,<br>(A) 25% Methyl<br>Methacrylate,<br>(B) 60% Ethyl<br>Acrylate | Example XV<br>20% Acrylamide,<br>(A) 20% Methyl<br>Methacrylate,<br>(B) 60% Ethyl<br>Acrylate | Example XVI<br>15% Acrylamide,<br>(A) 25% Styrene,<br>(B) 60% Ethyl<br>Acrylate | Example XVII<br>20% Acrylamide,<br>(A) 40% Styrene,<br>(B) 40% Butadiene | Example XVIII<br>20% Acrylamide,<br>(A) 80% Vinyl<br>Toluene |
|---|---|---|---|---|---|
| Polymerization Charge and Procedure, parts by weight: | | | | | |
| Acrylamide | 15 | 40 | 15 | 160 | 250. |
| Monomer A | 25 | 40 | 25 | 320 | 1,000. |
| Monomer B | 60 | 120 | 60 | 320 | |
| Catalyst | 1.0 C | 2 A | 1 C<br>1 A | 16.0 B | 25.0 A. |
| Modifier | 1.0 F | 2 D | 1 F | 8.0 E | |
| Solvent: | | | | | |
| Butanol | 20.0 | 200 | 20.0 | 1,200 | 1,250. |
| Xylene | | | | 500 | |
| Reflux time (hours) | 4 | 4 | 6 | 16 [1] | 10. |
| Polymer Properties: | | | | | |
| Percent solids | 52.5 | 51.6 | 51.5 | 25.1 | 49.1 |
| Viscosity (Gardner-Holdt) | $Z_3$ | $Z_5$-$Z_6$ | Z | | |
| Formaldehyde Condensate, parts: | | | | | |
| Butanol solution of formaldehyde | 6.34 | 84.6 | 6.34 | 339 | 75/351.[2] |
| Maleic anhydride | 0.4 | 1.0 | 0.4 | 4.5 | 1.0. |
| Reflux time (hours) | 3 | 3½ | 3 | 4 | 16. |
| Final Product: | | | | | |
| Percent solids | 50.1 | 48.95 | 50.6 | 49.4 [3] | 41.3. |
| Viscosity (Gardner-Holdt) | Y | Y | U-V | Z | X-Y. |
| Color (Gardner) | 3-4 | <1 | 3-4 | 3-4 | 1-2. |

[1] In bomb.  [2] Parts resin.  [3] Solids obtained by partial distillation of solvents.

EXAMPLE XIX

Two hundred six and three-tenths (206.3) parts of styrene, 37.5 parts of acrylamide and 6.25 parts of methacrylic acid were admixed with 2.5 parts of tertiary dodecyl mercaptan (chain transfer agent), 125 parts of butanol, 125 parts of toluene, and 2.5 parts of cumene hydroperoxide. The resulting mixture was refluxed for 2 hours, after which an additional 1.25 parts of cumene hydroperoxide was added. Refluxing was then continued for a further period of 2 hours, at which time a final addition of 1.25 parts of cumene hydroperoxide was made and refluxing continued until a conversion of substantially 100 percent was obtained. The resulting product was then admixed with 79.4 parts of a 40 percent solution of formaldehyde in butanol and 1 part of maleic anhydride catalyst. The resulting mixture was then refluxed under azeotropic conditions for 3 hours to remove water of reaction. The resinous product had the following properties:

Solids (percent) _____ 48-52
Weight per gallon (pounds) _____ 8.07
Viscosity (Gardner-Holdt) _____ V-Y
Color (Gardner) _____ Under 7
Acid value _____ 5.5 to 7.5

EXAMPLE XX

An acrylamide interpolymer was prepared from the following components:

| | Parts by weight |
|---|---|
| Acrylamide | 15 |
| Styrene | 35 |
| Ethyl acrylate | 44 |
| Methacrylic acid | 6 |
| Xylene | 50 |
| Butanol | 50 |

The above mixture was refluxed in the presence of 1 part tertiary dodecyl mercaptan and 1 part cumene hydroperoxide for 2 hours, after which was added 0.5 part cumene hydroperoxide, and the reaction mass was refluxed for another 2-hour period, after which was added 0.5 part cumene hydroperoxide, 31.7 parts Formcel, and 0.25 part maleic anhydride. The mass was refluxed for 3 hours azeotropically to remove the formed water, during which 55 parts of solvent were removed. The reaction was then cooled to 175° C. and 10.1 parts of an epoxy resin (Bakelite 2002) and 61 parts xylene were mixed therein. The resulting resinous composition had the following properties:

Solids (percent) _____ 48-52
Viscosity (Gardner-Holdt) _____ U-W
Color (Gardner) _____ Under 7
Weight per gallon (pounds) _____ 7.98
Acid value (50 percent solids) _____ 14.7

EXAMPLE XXI

The resinous product of Example XX was cooled to about 175° C. and was blended with 10 percent of an epoxy resin (epoxide equivalent 450-525) based on the weight of the total mixture. This blend was stirred until it was homogeneous and cooled. Results: Solids (percent)—50.

EXAMPLE XXII

An interpolymer was prepared from a mixture of the following materials:

| | Parts by weight |
|---|---|
| Styrene | 206 |
| Methacrylic acid | 6.25 |
| Acrylamide | 37.5 |
| Butanol | 125 |
| Toluene | 125 |

The above mixture was refluxed for 2 hours in the presence of 7.5 parts cumene hydroperoxide and 2.5 parts tertiary dodecyl mercaptan and then for 3 more successive 2-hour reflux periods, after each of which was added 27 parts cumene hydroperoxide. After the fourth reflux period 10 parts cumene hydroperoxide and 675 parts of an epoxy resin (epoxide equivalent 450-525) were added. This mixture was then refluxed for another hour, cooled to 180° F. The resulting resin had the following properties:

Viscosity (Gardner-Holdt) _____ W-X
Solids (percent) _____ 50

EXAMPLE XXIII

An interpolymer was prepared from a mixture of the following materials:

| | Parts by weight |
|---|---|
| Acrylamide | 540 |
| Styrene | 1350 |
| Ethyl acrylate | 3510 |
| Aromatic solvent (B.P. range 185° C.–205° C.) (Solvesso 150) | 2700 |
| n-Butanol | 2700 |

The above mixture was refluxed in the presence of 51 parts cumene hydroperoxide and 51 parts tertiary dodecyl mercaptan and four 2-hour periods, after each of which were added 27 parts cumene hydroperoxide. The mixture was then cooled to about 210° F. and the fourth addition of 27 parts cumene hydroperoxide was added with 1135 parts butyl Formcel and 14.3 parts maleic anhydride. The mixture was then refluxed through a decanter for 4 hours after which 315 parts of an epoxy resin (epoxide equivalent 450–525) was added. This solution was then refluxed for one-half hour, cooled to 200° F. and filtered. The resulting resinous composition had the following properties:

| | |
|---|---|
| Viscosity (Gardner-Holdt) | S–V |
| Solids (percent) | 50 |

EXAMPLE XXIV

An acrylamide interpolymer was prepared from the following components in the amounts set forth:

| | Parts by weight |
|---|---|
| Styrene | 39 |
| Ethyl acrylate | 44 |
| Acrylamide | 15 |
| Acrylic acid | 2 |
| Butanol | 100 |
| Cumene hydroperoxide | 1 |
| Tertiary dodecyl mercaptan | 1 |

The above components were mixed and refluxed for 2 hours, after which an additional 0.5 part of cumene hydroperoxide was added and reflux continued for a further period of 2 hours. An additional 0.5 part of cumene hydroperoxide was added and the mixture refluxed for an additional 2 hours. The resultant interpolymer was then reacted with formaldehyde by adding thereto a solution comprising 0.4 mole of formaldehyde (40 percent concentration in butanol) and about 0.33 part of maleic anhydride. The resulting mixture was refluxed for 3 hours, after which one-half of the butanol was removed by distillation and replaced by an equal amount of xylene. The resin thus formed had the following properties:

| | |
|---|---|
| Solids (percent) | 48–52 |
| Weight per gallon (pounds) | 8.2 |
| Viscosity (Gardner-Holdt) | S–X |
| Color (Gardner) | 7 maximum |

EXAMPLE XXV

The following materials were charged into a glass reactor:

| | Parts by weight |
|---|---|
| Butanol | 100 |
| Chlorobutadiene (57.8 percent solids in xylene) | 119 |
| Styrene | 71 |
| Acrylamide | 23.6 |
| Benzoyl peroxide | 1.5 |
| Tertiary dodecyl mercaptan | 1.5 |

The above mixture was refluxed at a temperature of 92° C. to 119° C. for 9 hours, with 1 part of cumene hydroperoxide being added after the second, fourth and sixth hours. After the 9 hours of reflux, the total solids of the reaction mixture was 35.8 percent. Five-tenths (0.5) part of cumene hydroperoxide was then added and the mixture refluxed for an additional hour at 118° C.

Fifty six and six-tenths (56.6) parts of a butanol solution of formaldehyde (40 percent formaldehyde) and 1.32 parts of maleic anhydride were then added and the entire mixture refluxed at a temperature in the range of 110° C. to 97° C. for 2 hours, after which 70 parts of solvent (and some water) was removed by distillation to give a total solids content of 47 percent, and a Gardner-Holdt viscosity of E. The polymer at a 40 percent solids content had a chloride content of 8.4 percent. Hard, flexible, impact resistant films were obtained by baking the resin at 350° F. for one-half hour.

EXAMPLE XXVI

| | Parts by weight |
|---|---|
| Methacrylamide | 75 |
| Styrene | 395 |
| Methacrylic acid | 30 |
| Xylene | 250 |
| Isobutanol | 250 |

The above ingredients were refluxed in the presence of 0.10 part tertiary dodecyl mercaptan and 5 parts cumene hydroperoxide for 2 hours. Two and five-tenths (2.5) parts cumene hydroperoxide were added and the mixture refluxed for two more 2-hour intervals after each of which were added 2.5 more parts cumene hydroperoxide. After the third reflux period, 157 parts isobutyl Formcel and 2 parts maleic anhydride were added with the cumene hydroperoxide. The mixture was then azeotropically distilled for 2 hours and 2.5 more parts of cumene hydroperoxide were added and the mixture was refluxed azeotropically for 2 hours. The resulting product had the following properties:

| | |
|---|---|
| Solids (percent) | 50.7 |
| Viscosity (Gardner-Holdt) | W+ |

Although specific examples of the invention have been set forth hereinabove, it is not intended to limit the invention solely thereto, but to include all of the variations and modifications falling within the scope of the appended claims.

We claim:

1. A composition comprising (1) an interpolymer of a polymerizable unsaturated carboxylic acid amide selected from the class consisting of acrylamide and methacrylamide and at least one other monomer containing a CH$_2$=C< group, said interpolymer containing from about 2 to about 50 percent by weight based on the total weight of said interpolymer of said amide and being characterized by having amido hydrogen atoms replaced by the structure:

where R is selected from the class consisting of hydrogen and hydrocarbon radicals and R$_1$ is at least one member selected from the class consisting of hydrogen and alkyl radicals containing from about 1 to about 8 carbon atoms, and (2) at least about 0.2 percent based on the weight of said composition of an ester of titanic acid.

2. The compositon of claim 1 wherein the titanium ester is tetrabutyl titanate.

3. The composition of claim 1 wherein the titanium ester is tetraisopropyl titanate.

4. The composition of claim 2 wherein the interpolymer is an interpolymer comprising acrylamide and styrene.

5. The composition of claim 2 wherein the interpolymer is an interpolymer of acrylamide, styrene, ethyl acrylate and the member selected from the class consisting of acrylic acid and methacrylic acid.

6. The composition of claim 3 wherein the interpolymer is an interpolymer comprising acrylamide and styrene.

7. The composition of claim 3 wherein the interpolymer is an interpolymer comprising acrylamide, styrene, ethyl acrylate and a member selected from the class consisting of acrylic acid and methacrylic acid.

8. A composition comprising a mixture of (1) an interpolymer of acrylamide and at least one other monomer containing a CH$_2$=C< group, said interpolymer containing from about 2 to about 50 percent by weight of acrylamide and being characterized by having amido hydrogen atoms replaced by the structure —$CH_2OR_1$, wherein at least about 50 percent of the $R_1$ groups are alkyl radicals containing from about 1 to about 8 carbon atoms, and the remainder of said $R_1$ groups are hydrogen, and (2) at least about 0.2 percent based on the weight of said composition of an ester of titanic acid.

9. The composition of claim 8 wherein the titanium ester is tetrabutyl titanate.

10. The composition of claim 8 wherein the titanium ester is tetraisopropyl titanate.

References Cited in the file of this patent

UNITED STATES PATENTS

| | | |
|---|---|---|
| 2,614,112 | Boyd | Oct. 14, 1952 |
| 2,810,713 | Melamed | Oct. 22, 1957 |
| 2,870,116 | Vogel et al. | Jan. 20, 1959 |

OTHER REFERENCES

Metal-Organic Compounds, American Chemical Society, Washington, D.C., 1959, page 289.